(12) United States Patent
Kobori

(10) Patent No.: US 8,694,975 B2
(45) Date of Patent: Apr. 8, 2014

(54) PROGRAMMING SYSTEM IN MULTI-CORE ENVIRONMENT, AND METHOD AND PROGRAM OF THE SAME

(75) Inventor: Tomoyoshi Kobori, Tokyo (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 13/062,761

(22) PCT Filed: Jul. 23, 2009

(86) PCT No.: PCT/JP2009/063217
§ 371 (c)(1),
(2), (4) Date: Mar. 8, 2011

(87) PCT Pub. No.: WO2010/029812
PCT Pub. Date: Mar. 18, 2010

(65) Prior Publication Data
US 2011/0167417 A1      Jul. 7, 2011

(30) Foreign Application Priority Data

Sep. 9, 2008   (JP) ................................. 2008-231080

(51) Int. Cl.
*G06F 9/45*              (2006.01)

(52) U.S. Cl.
USPC ......................................... 717/149; 717/140

(58) Field of Classification Search
USPC ................................................ 717/149, 140
See application file for complete search history.

(56) References Cited

U.S. PATENT DOCUMENTS

| 5,247,678 A | * | 9/1993 | Littleton ........................ 719/331 |
| 5,884,054 A | * | 3/1999 | Izquierdo et al. ............. 710/307 |
| 2006/0074931 A1 | | 4/2006 | Burka et al. |
| 2006/0095898 A1 | | 5/2006 | Chow et al. |
| 2006/0212440 A1 | * | 9/2006 | Heishi et al. ...................... 707/4 |

FOREIGN PATENT DOCUMENTS

| JP | 63-163530 A | 7/1988 |
| JP | 8-241216 A | 9/1996 |
| JP | 8-286896 A | 11/1996 |
| JP | 2004078600 A | 3/2004 |
| JP | 2006260096 A | 9/2006 |
| JP | 2007128175 A | 5/2007 |
| JP | 2007328416 A | 12/2007 |
| JP | 2008518355 A | 5/2008 |

OTHER PUBLICATIONS

International Search Report for PCT/JP2009/063217 mailed Aug. 25, 2009.

(Continued)

*Primary Examiner* — Li B Zhen
*Assistant Examiner* — Hui-Wen Lin
(74) *Attorney, Agent, or Firm* — Sughrue Mion, PLLC

(57) ABSTRACT

A first compiler generates one or more object codes from a program code for a first processor included in an arithmetic processing system to which a plurality of processors are mutually connected. A first linker links the generated one or more object codes to generate an execution file for the first processor. A parameter information generation unit generates, based on the information acquired from the first linker, parameter information used in a second processor included in the arithmetic processing system. A second compiler refers to a program code and the parameter information for the second processor to generate one or more object codes. A second linker links the generated one or more object codes to generate an execution file for the second processor.

6 Claims, 9 Drawing Sheets

(56) References Cited

OTHER PUBLICATIONS

European search report for EP09812960.4-2211 dated Jan. 30, 2013.
M. Narasinga Rao: "SrijanSoft: A Retargetable Software Synthesis Framework for Heterogeneous Multiprocessors", May 1 2BB4 (2BB4-B5-B1), pp. 1-85, XPB55B5B17B, Retrieved from the Internet: URL:http://citeseerx.ist.psu.edu/viewdocfdownload?doi=1B.1.1.74.3551&rep=rep1&type=pdf [retrieved on 2B13-B1-17] p. 1-p. 24; figure 2.2.

* cited by examiner

PROGRAMMING SYSTEM IN MULTI-CORE ENVIRONMENT, AND METHOD AND PROGRAM OF THE SAME

This application is the National Phase of PCT/JP2009/063217, filed Jul. 23, 2009, which is based upon and claims the benefit of priority from prior Japanese Patent Application No. 2008-231080, filed on Sep. 9, 2008, the entire contents of which are incorporated herein by reference.

TECHNICAL FIELD

The present invention relates to a programming system of a multi-core processor having a plurality of programming cores, and its method and program.

BACKGROUND ART

In recent years, with advancement of a processing technique, an SoC (System on a chip) obtained by mounting the entire system combining a large number of arithmetic circuits on one chip is realized. The large number of arithmetic circuits include a programmable core such as a processor. By combining programmable cores having different architectures depending on an application to be used, enhancement of arithmetic efficiency/resource use efficiency can be achieved. Such a method of implementing cores of different types is generally called heterogeneous multi-core.

A technique relating to the heterogeneous multi-core is disclosed in PTL 1. The technique disclosed in PTL 1 relates to a global compiler for a heterogeneous multi-core processor. In the technique disclosed in PTL 1, a heterogeneous multi-core processor system (HCMP) includes a plurality of different types of processor units (PU) and a shared memory. All the processor units can access to the shared memory.

In PTL 1, as architecture configuration information parameters, types and the number of PU's, an operation speed ratio of the PU with a bus, a type of a memory of each PU, a memory size, memory access latency, types of memories of the HCMP, size, latency, or the like are previously input. By utilizing such architecture configuration information parameters, it is possible to make the multiprocessor to operate efficiently.

CITATION LIST

Patent Literature

{PTL 1} JP-A-2007-328416

SUMMARY OF INVENTION

Technical Problem

However, the technique disclosed in PTL 1 can be applied only to a case where a multi-thread or multi-task architecture is used to synthesize execution files required respectively for a plurality of programmable cores from a single programming model. A more specific description will be made below on this point.

As a method of performing execution scheduling in the multi-core system having a plurality of programmable cores, the following two methods are known.
1) The first method is a method that uses a multi-thread or multi-task architecture to synthesize execution files required respectively for a plurality of programmable cores from a single programming model. 2) The second method is a method that performs programming individually for a plurality of programmable cores to generate execution files individually corresponding to the programmable cores.

The technique disclosed in PTL 1 can be applied to the first method, but cannot be applied to the second method.

Then, a case where the programming is performed according to the second method will be examined with reference to FIGS. 8 and 9. FIGS. 8 and 9 illustrate basic configurations and operations of a programming system of the related art.

The left side of FIG. 8 is a first processor tool flow. In this tool flow, a first compiler 601 compiles a first code description 600 input thereto from a program code into object codes. Thereafter, a first linker 602 links the object codes together to thereby generate a first execution file 603.

On the other hand, the right side of FIG. 8 is a second processor tool flow. Generally, in the case where a programming is performed according to the above second method, information such as memory/register/interruption register map is manually extracted from the program codes of the programmable cores so as to meet input/output requests of the programmable cores. The extracted information need to be shared between the programmable cores. In FIG. 8, a first code reference 604 is executed to extract the information, and the extracted information is set as a parameter information file description 605 for information sharing.

In the case where software development is carried out in a multi-core system according to the above procedure, every time a program code is updated, the improved information thereof needs to be shared, complicating a development flow. This may not only degrade the programming efficiency, but also cause incorporation of bugs.

Further, there exists a method implemented according to a second processor tool flow illustrated in the right side of FIG. 9, in which as preprocessing for the compilation performed by a second compiler 607, parameter information is manually extracted, and a parameter information file generation tool 611 is used to perform processing of generating a file describing a specific pattern.

However, the parameter information file generation tool 611 does not link to a first processor tool flow for the file generation. Thus, it is necessary to generate a file described in a format conforming to the parameter information file generation tool 611 before the file generation by the parameter information file generation tool 611, which is by no means efficient.

An object of the present invention is therefore to provide a programming system in a multi-core environment, and its method and program, capable of providing a development environment with high programming efficiency in the case where multi-core system software development is performed in an environment where a plurality of programmable cores each have an individual programming model.

Solution to Problem

A programming system according to the present invention is characterized by including: a first compiler that generates one or more object codes from a program code for a first processor included in an arithmetic processing system to which a plurality of processors are mutually connected; a first linker that links the one or more object codes generated by the first compiler to generate an execution file for the first processor: a parameter information generation unit that generates, based on the information acquired from the first linker, parameter information used in a second processor included in the arithmetic processing system; a second compiler that refers to a program code and the parameter information for the second processor to generate one or more object codes; and a second linker that links the one or more object codes generated by the second compiler to generate an execution file for the second processor.

A programming method according to the present invention is characterized by including: a first step in which a first compiler generates one or more object codes from a program code for a first processor included in an arithmetic processing system to which a plurality of processors are mutually connected; a second step in which a first linker links the one or more object codes generated by the first compiler to generate an execution file for the first processor: a parameter information generation step of generating, based on the information acquired from the first linker, parameter information used in a second processor included in the arithmetic processing system; a third step in which a second compiler refers to a program code and the parameter information for the second processor to generate one or more object codes; and a fourth step in which a second linker links the one or more object codes generated by the second compiler to generate an execution file for the second processor.

A programming program according to the present invention is characterized by allowing a computer to function as: a first compiler that generates one or more object codes from a program code for a first processor included in an arithmetic processing system to which a plurality of processors are mutually connected; a first linker that links the one or more object codes generated by the first compiler to generate an execution file for the first processor: a parameter information generation unit that generates, based on the information acquired from the first linker, parameter information used in a second processor included in the arithmetic processing system; a second compiler that refers to a program code and the parameter information for the second processor to generate one or more object codes; and a second linker that links the one or more object codes generated by the second compiler to generate an execution file for the second processor.

Advantageous Effects of Invention

According to the present invention, in a programming process of one programmable core, a file having parameter information required for use in another programmable core can automatically be generated. Further, the development flow in which sharing of update information of the program code has been required every time the program code is updated is simplified to thereby eliminate a cause of the incorporation of bugs, so that it is possible to provide a development environment with high programming efficiency.

DESCRIPTION OF EMBODIMENTS

Exemplary embodiments of the present invention will be described with reference to the accompanying drawings.

First Exemplary Embodiment

The outline of the first exemplary embodiment of the present invention will be described. A programming system in a multi-core environment according to the present exemplary embodiment provides an environment for multi-core system software development performed in an environment where a plurality of programmable cores each have an individual programming model.

Figure 1:
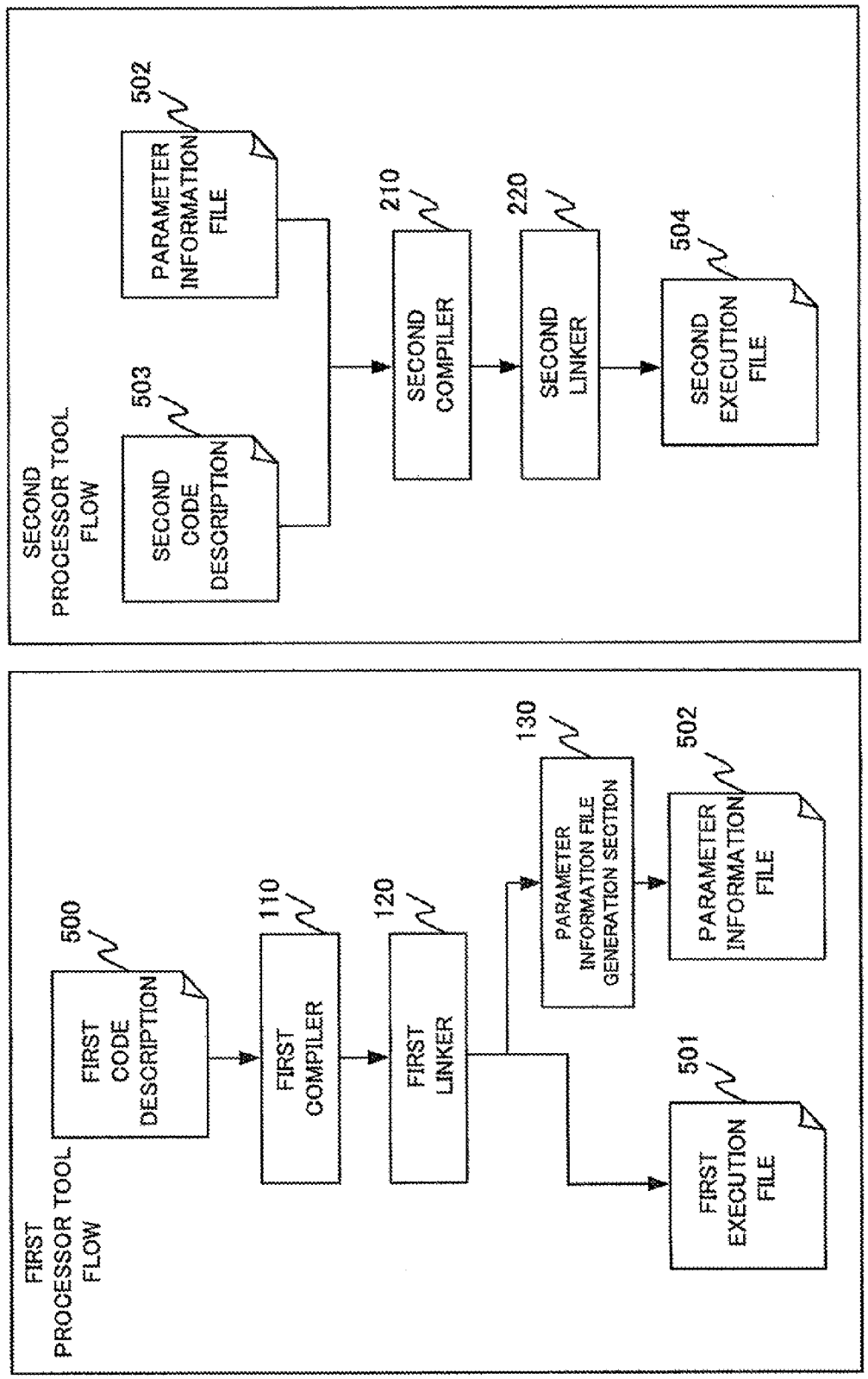
FIG. 1 A view illustrating a basic configuration of a programming system in a multi-core environment according to a first exemplary embodiment of the present invention.
Figure 8:
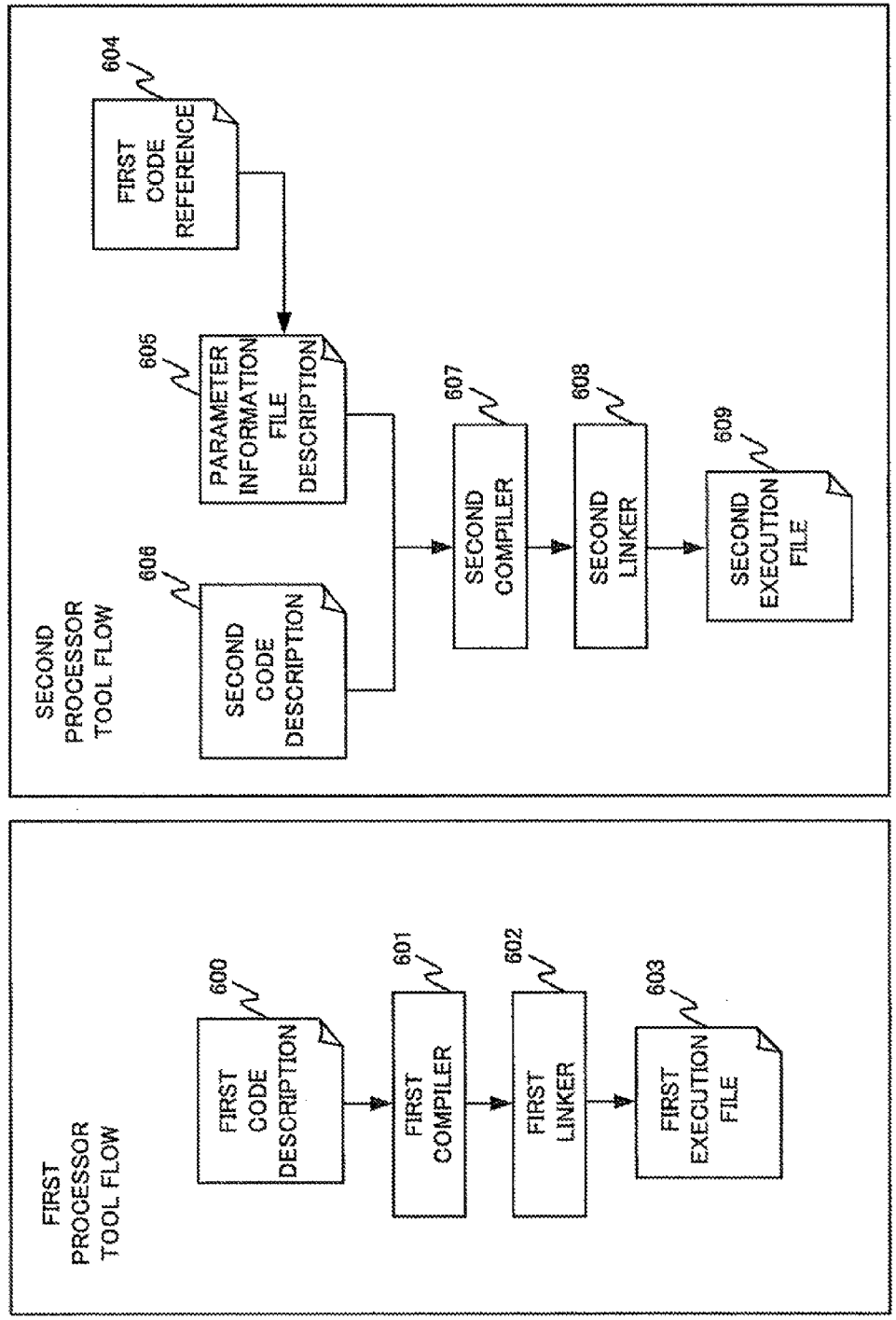
FIG. 8 A view illustrating a basic configuration and operation of a programming system in a multi-core environment according to the related art.
Figure 9:
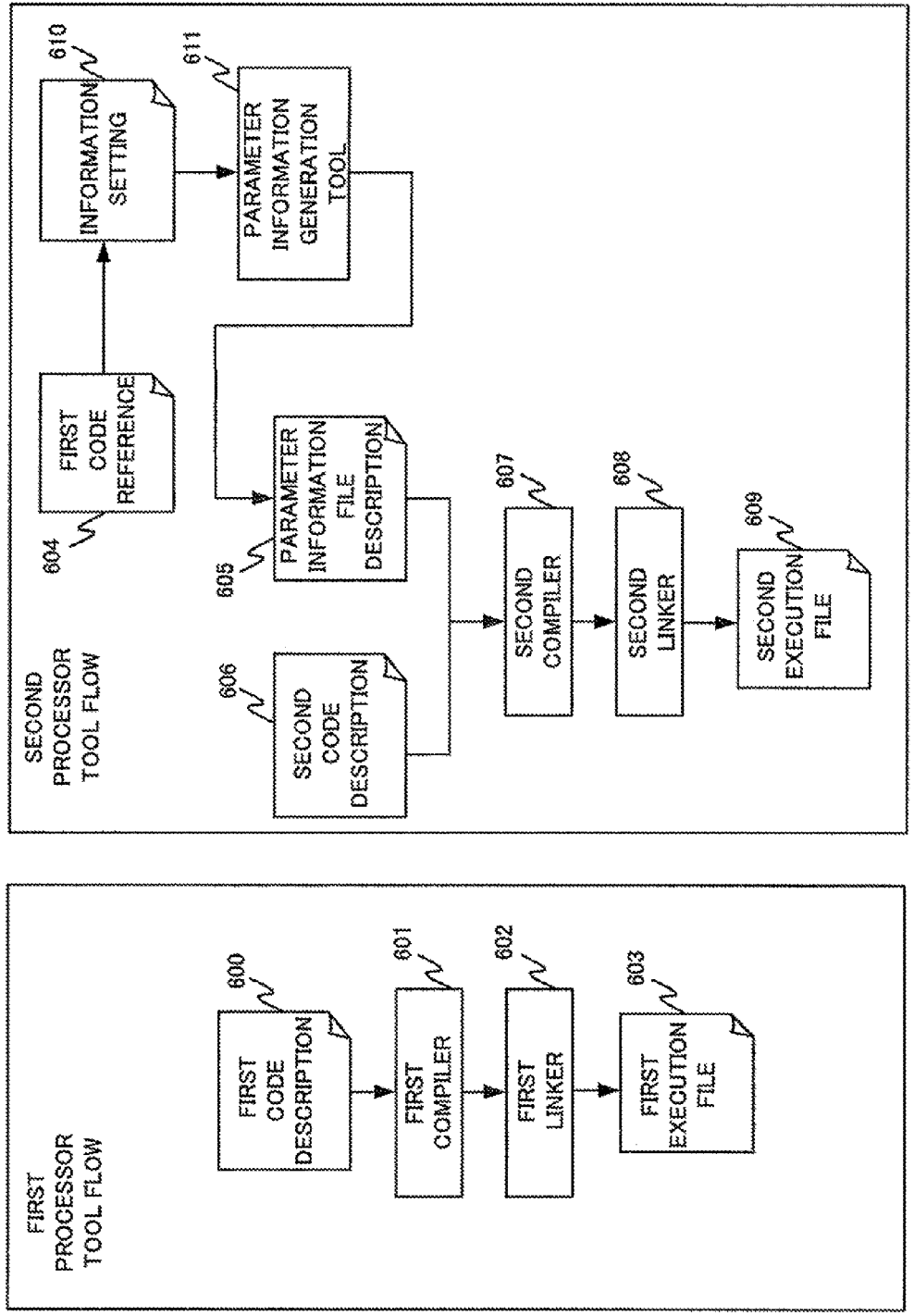
FIG. 9 A view illustrating a basic configuration and operation of the programming system according to the related art in the case where a parameter information generation tool is added to the system.

FIG. 1 illustrates a basic configuration the programming system according to the present exemplary embodiment and a software development flow therein. The programming system of FIG. 1 differs from that of the related art illustrated in FIG. 8 in that a header file generation function (in FIG. 1 and subsequent drawings and in the following description, referred to as parameter information file generation section 130) that generates, as a header file, information such as register/memory map from compilation information at the time of compilation for generating object codes from a program code in the tool flow of the first processor is newly provided.

The present exemplary embodiment will be described in detail with reference to the accompanying drawings.

Figure 2:
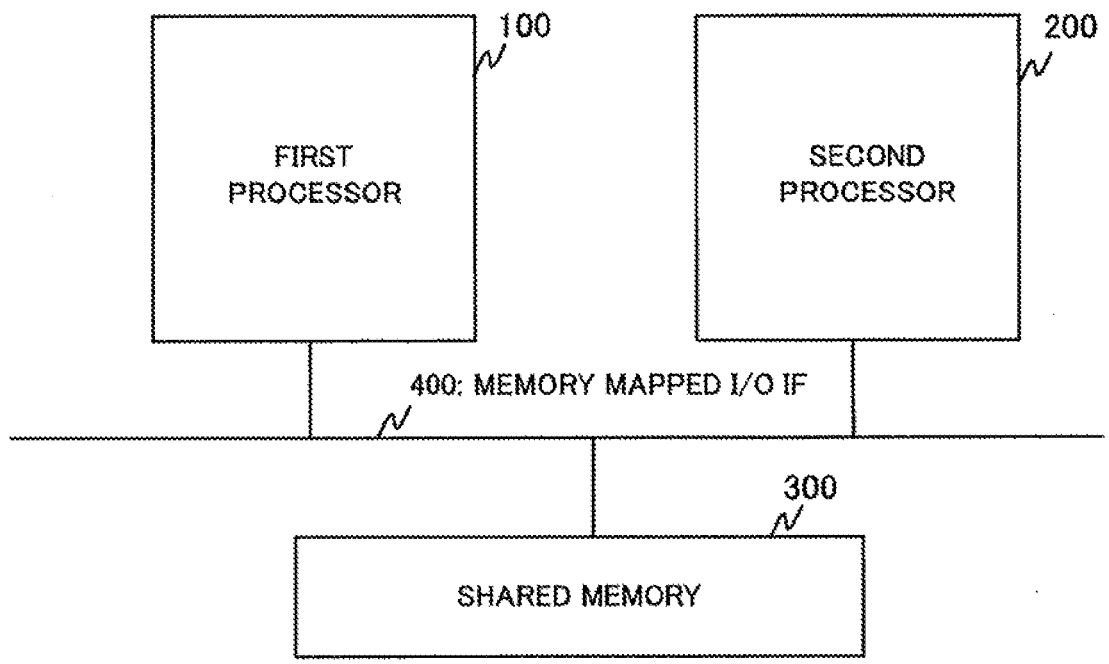
FIG. 2 A block diagram illustrating the entire configuration of a target system in the programming system illustrated in FIG. 1.

FIG. 2 illustrates the entire configuration of a target system (arithmetic processing system) in the programming system according to the present exemplary embodiment. The target system has a plurality of processors (first processor 100 and second processor 200) as illustrated in FIG. 2.

The processors used here are each an arithmetic unit that can perform programming according to a tool flow using a compiler and a linker. These processors are connected to each other by an IF 400 of a memory map (memory-mapped input/output). The target system further has a shared memory 300. Each of the processors can start its operation from a predetermined instruction address with a command issuance from each processor as a trigger.

A first processor tool flow and a second processor tool flow illustrated in FIG. 1 represent tool flows of the respective processors (first processor 100 and second processor 200).

Next, components and data in the programming system of FIG. 1 will be described.

As illustrated in FIG. 1, a first processor tool flow includes a first compiler 110, a first linker 120, a parameter information file generation section (parameter information generation unit of the present invention) 130, a first code description 500, a first execution file 501, and a parameter information file 502. The second processor tool flow 200 includes a second compiler 210, a second linker 220, a parameter information file 502, a second code description 503, and a second execution file 504.

The first code description 500 and second code description 503 are program codes for programs of the first and second processors 100 and 200, respectively.

The first compiler 110 and second compiler 210 are each a compiler that generates object codes from a program code.

The first linker 120 and second linker 220 are linkers that link the object codes generated by the compiler 110 and compiler 210.

The first execution file 501 and second execution file 504 are each an execution file output from the linker.

The parameter information file generation section 130 is a parameter information file generation section that generates the first parameter information file 502 for the second processor 200 from linker map information acquired from the first linker 120.

The parameter information file 502 is a parameter information file describing start addresses of functions acquired from the linker map.

Figure 3:
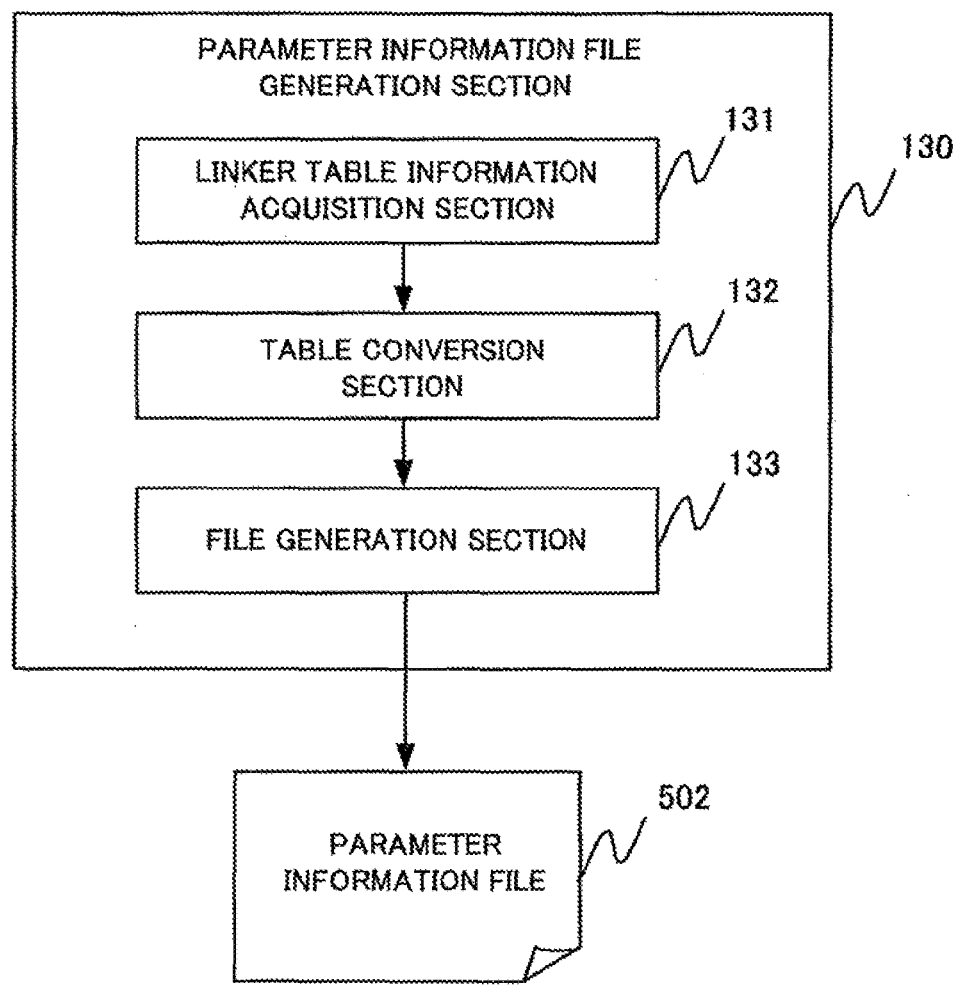
FIG. 3 A block diagram illustrating a basic configuration of a parameter information file generation section illustrated in FIG. 1.

Next, with reference to FIG. 3, details of the parameter information file generation section 130 will be described.

The parameter information file generation section 130 has a linker table acquisition section 131, a table conversion section 132, and a file generation section 133.

The linker table acquisition section 131 is a functional block that acquires linker table information acquired from the linker. The linker table information is table information in which the initial addresses of functions are stored.

The table conversion section 132 is a functional block that converts the linker table that the linker table acquisition section 131 has acquired into parameters for use in the second processor 200. The file generation section 133 is a functional block that generates a header file for use in the second processor 200. In the drawings and the following description, this header file is referred to as "parameter information file 502".

Figure 4:
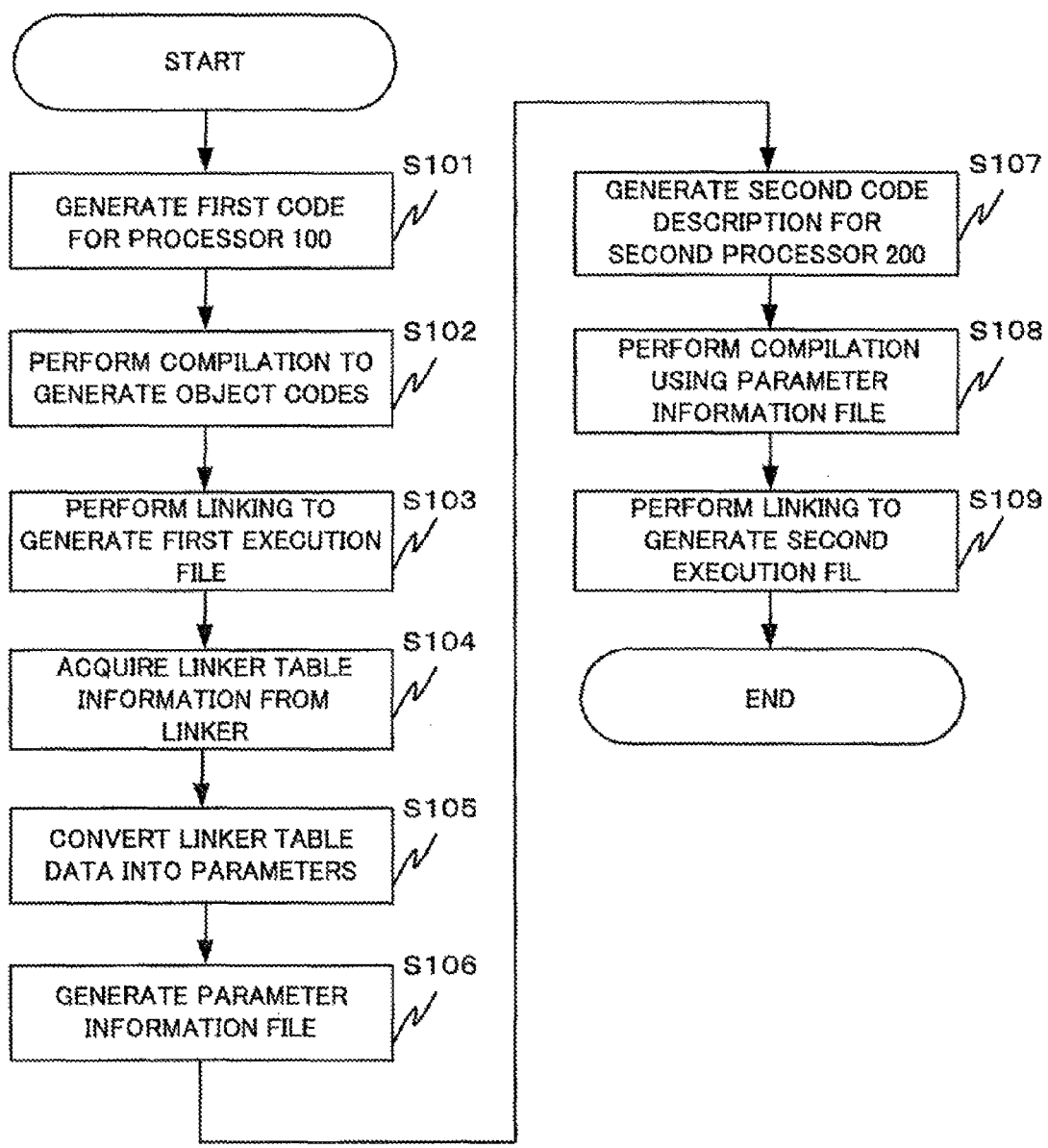
FIG. 4 A flowchart illustrating basic operation of the programming system illustrated in FIG. 1.

Next, operation will be described with reference to a flowchart of FIG. 4. First, operation for generating the first execution file 501 for the processor 100 will be described.

First, the first code description 500 for the first processor 100 is generated (step S101). Then, the first compiler 110 compiles the first code description 500 to generate object codes (step S102). Subsequently, the first linker 120 links one or more object codes together to thereby generate the first execution file 501 (step S103).

At this time, the functional blocks of the parameter information file generation section 130 performs the abovementioned operations, and whereby the map information and the like are read out from the first linker 120 and information required for the operation of the second processor 200 is selected so as to generate the parameter information file 502 as the header file (steps S104 to S106).

Then, the second execution file 504 for the second processor 200 is generated (steps S107 to S109).

That is, the second code description 503 for the second processor 200 is generated (step S107). Then, the second compiler 210 uses the parameter information file 502 acquired from the tool flow of the first processor 100 to compile the second code description 503 to thereby generate object codes (step S108). Subsequently, the second linker 220 links the one or more object codes to generate the second execution file 504 (step S109).

With the above operation, in the present exemplary embodiment, the development flow in which sharing of update information of the program code has been required every time the program code is updated is simplified to thereby eliminate a cause of the incorporation of bugs, so that it is possible to provide a development environment with high programming efficiency.

A case where two processors exist has been described in the above exemplary embodiment. However, the present invention can be applied not only to the case where two processors exist, but also to a case where three or more processors exist. In the case where three or more processors exist, by adding the parameter information file generation section 130 to a linker for each processor, it is possible to obtain the same effect as in the case where two processors exist. A more specific description will be made below on this point with reference to FIG. 5.

Figure 5:
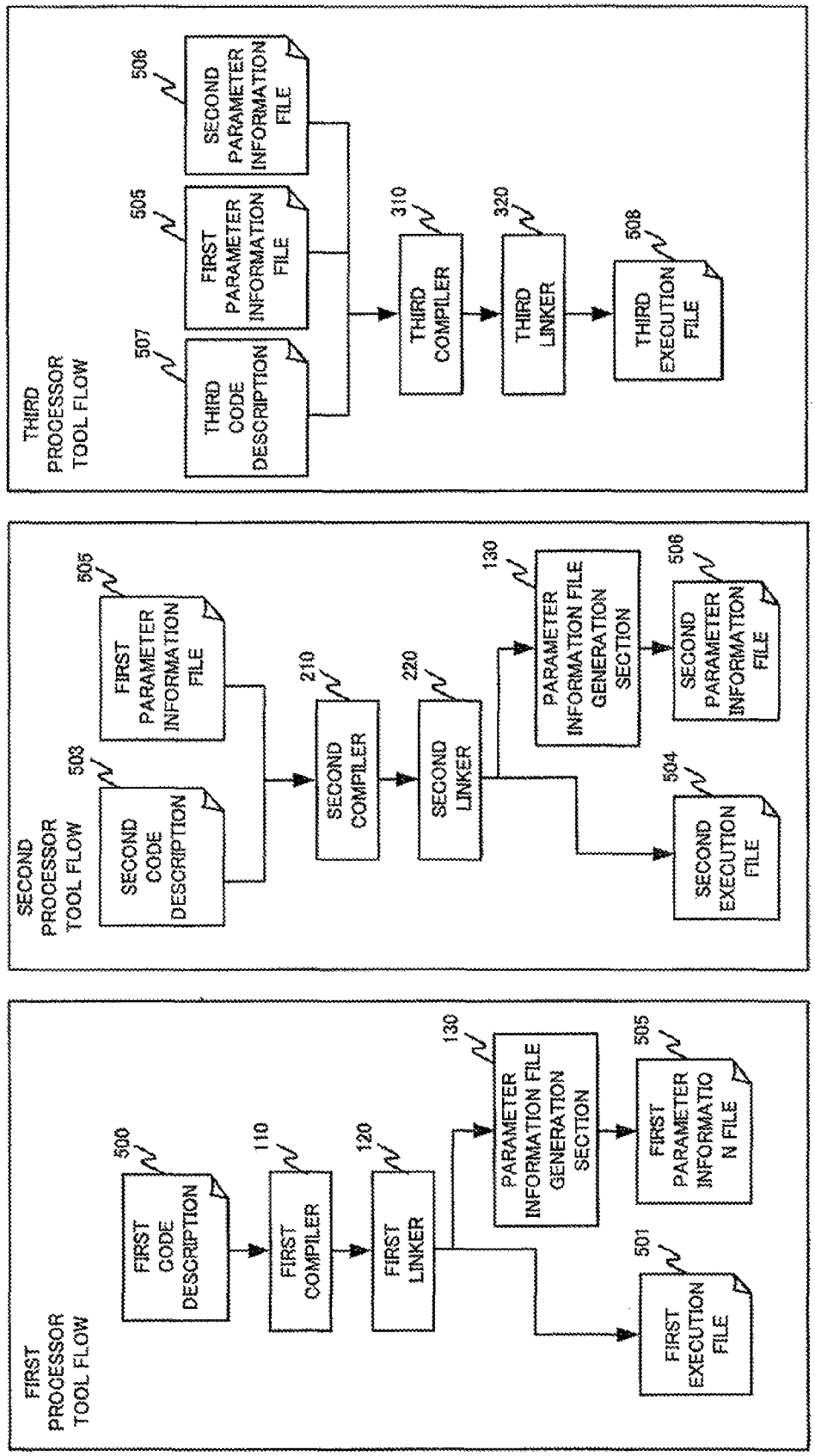
FIG. 5 A view illustrating a basic configuration of the programming system of FIG. 1 in the case where three processors exist the system.

The parameter information file generation section 130 is added to the second processor tool flow of FIG. 5. The parameter information file generation section 130 in the second processor tool flow reads out the map information and the like from the second linker 220 and selects information required for the operation of another processor so as to generate a second parameter information file 506 as a header file. Then, in a third processor tool flow, the first parameter information file 505 and second parameter information file 506 are used to perform compilation. When the number of the processors is further increased, a processor tool flow having the parameter information file generation section 130 is added by an increase in the number of the processors.

That is, in the case where an arithmetic processing system as the target system has N (N is an integer not less than 3) processors, the parameter information file generation section 130 are provided in N−1 tool flows out of total N tool flows of processors, respectively. Even in this configuration, it is possible to obtain the same effect as in the case where two processors exist.

Second Exemplary Embodiment

A second exemplary embodiment will be described as another exemplary embodiment of the present invention.

Figure 6:
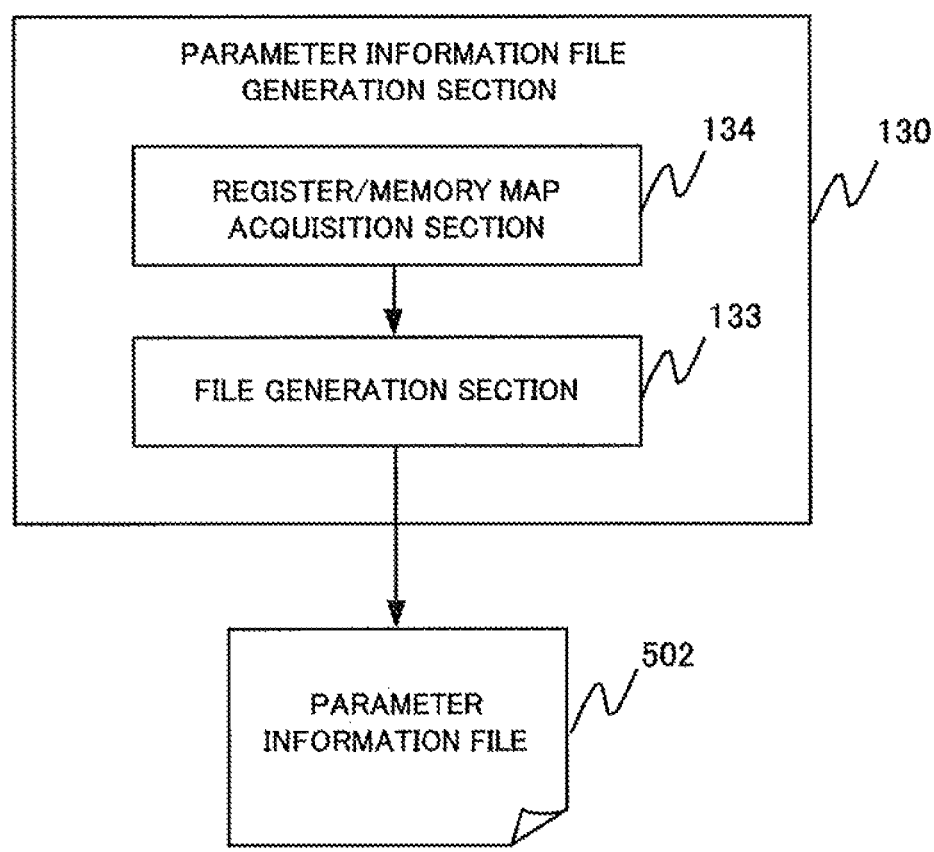
FIG. 6 A view illustrating a basic configuration of a parameter information file generation section of a programming system in a multi-core environment according to a second exemplary embodiment of the present invention.

A programming system according to the present exemplary embodiment is a modification of the first exemplary embodiment and differs from the first exemplary embodiment in the internal configuration of the parameter information file generation section 130 as illustrated in FIG. 6. Specifically, the linker table acquisition section 131 and table conversion section 132 in the first exemplary embodiment are replaced by a register/memory map acquisition section 134.

In the first exemplary embodiment, the parameter information file generation section 130 generates the parameter information based on the linker table acquired from the linker, while in the present exemplary embodiment, the register/memory map acquisition section 134 refers to a map of registers that the processor itself has or an address map of data memories to generate the parameter information file.

The tool flows of the first and second processors in the present exemplary embodiment are the same as those in the first exemplary embodiment. With the above system, it is possible to share the contents of the data memories or registers by the memory mapped I/O.

Third Exemplary Embodiment

A third exemplary embodiment will be described as still another exemplary embodiment of the present invention.

Figure 7:
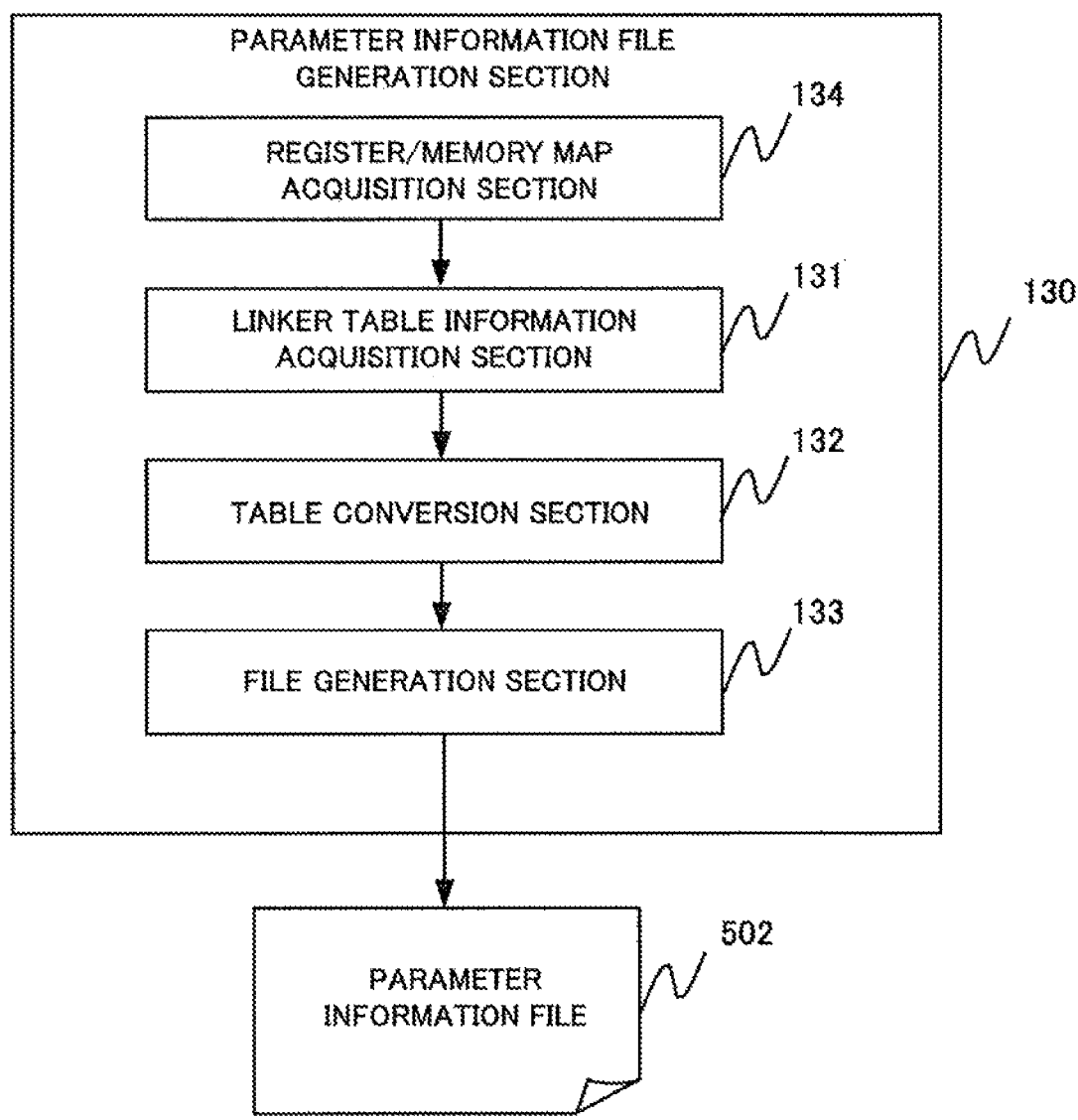
FIG. 7 A view illustrating a basic configuration of a parameter information file generation section of a programming system in a multi-core environment according to a third exemplary embodiment of the present invention.

A programming system according to the present exemplary embodiment is a combination of the first and second exemplary embodiments and differs from the first exemplary embodiment in that the register/memory map acquisition section 134 is added to the internal configuration of the parameter information file generation section 130 as illustrated in FIG. 7.

Specifically, in the present exemplary embodiment, the parameter information file generation section 130 generates the parameter information based on the linker table acquired from the linker as in the case of the first exemplary embodiment, as well as, the register/memory map acquisition section 134 refers to a map of registers that the processor itself has or an address map of data memories to generate the parameter information file as in the case of the second exemplary embodiment. The tool flows of the first and second processors in the present exemplary embodiment are the same as those in the first exemplary embodiment.

By adopting any of the above exemplary embodiments of the present invention, the development flow in which sharing of update information of the program code has been required every time the program code is updated is simplified to thereby eliminate a cause of the incorporation of bugs, so that it is possible to provide a development environment with high programming efficiency.

The programming system in a heterogeneous multi-core according to the present exemplary embodiment can be realized by a hardware, a software, or a combination thereof.

For example, although the programming system according to any of the above exemplary embodiments of the present invention can be realized by a hardware, it may be realized when a computer reads a program that allows the computer to function as the programming system from a computer-readable recording medium and executes the program.

Further, although the programming method according to any of the exemplary embodiments of the present invention can be realized by a hardware, it can be realized when a computer reads a program that allows the computer to execute the method from a computer-readable recording medium and executes the program.

Further, the above hardware configuration or software configuration is not especially limited but any hardware or software configurations may be applied as long as it can realize the functions of the above components. For example, a configuration in which each component constitutes an individual circuit or a part, or a configuration in which all the components are integrated in a single circuit or part may be adopted.

Although the present invention has been described using the exemplary embodiments, the present invention is not limited to the above exemplary embodiments. Further, various modifications that can be appreciated by those skilled in the art may be made to the configuration or details of the present invention within the scope of the present invention.

INDUSTRIAL APPLICABILITY

The present invention is suitably utilized in a development environment of, e.g., a multi-core processor LSI having a plurality of programmable cores.

REFERENCE SIGNS LIST

100: First processor
110, 601: First compiler
120, 602: First linker
130: Parameter information file generation section
131: Linker table information acquisition section
132: Table conversion section
133: File generation section
134: Register/memory map acquisition section
200: Second processor
210: 607: Second compiler
220, 608: Second linker
300: Shared memory
310: Third compiler
320: Third linker
400: Memory mapped I/O IF
500, 600: First code description
501, 603: First execution file
502: Parameter information file
503, 606: Second code description
504, 609: Second execution file
505: First parameter information file
506: Second parameter information file
507: Third code description
508: Third execution file
604: First code reference
605: Parameter information file description

The invention claimed is:

1. A programming system implemented on a computer including a processor and a memory, the programming system comprising:
   a first compiler that generates one or more object codes from a program code for a first processor included in an arithmetic processing system to which a plurality of processors are mutually connected;
   a first linker that links the one or more object codes generated by the first compiler to generate an execution file for the first processor;
   a parameter information generation unit that generates, based on the information acquired from the first linker, parameter information as a header file to be used in combination with a program code of a second processor included in the arithmetic processing system;
   a second compiler that generates one or more object codes from the program code and the header file for the second processor; and
   a second linker that links the one or more object codes generated by the second compiler to generate an execution file for the second processor,
   wherein the parameter information is related to at least one of addresses of functions and of data which are commonly used by the first and second processors when the first and second processors execute respective execution files, and
   wherein connection between the plurality of processors in the arithmetic processing system conforms to memory mapped I/O system, and the parameter information generation unit generates, as the parameter information, a header file defining parameters that have possibility to be accessed from the second processor and from the first processor based on address information in which functions acquired from the first linker are mapped and information of address maps of registers and data memories of the first processor.

2. The programming system according to claim 1, wherein the arithmetic processing system has N (N is an integer not less than two) processors, and the parameter information generation units are provided in N−1 tool flows out of total N tool flows of processors, respectively.

3. A programming method executed on a computer including a processor and a memory, the program method comprising:
   a first step in which a first compiler generates one or more object codes from a program code for a first processor included in an arithmetic processing system to which a plurality of processors are mutually connected;

a second step in which a first linker links the one or more object codes generated by the first compiler to generate an execution file for the first processor:

a parameter information generation step of generating, based on the information acquired from the first linker, parameter information as a header file to be used in combination with a program code of a second processor included in the arithmetic processing system;

a third step in which a second compiler generates one or more object codes from the program code and the header file for the second processor; and a fourth step in which a second linker links the one or more object codes generated by the second compiler to generate an execution file for the second processor, wherein the parameter information is related to at least one of addresses of functions and of data which are commonly used by the first and second processors when the first and second processors execute respective execution files, and wherein connection between the plurality of processors in the arithmetic processing system conforms to memory mapped I/O system, and the parameter information generation step, a header file defining parameters that have possibility to be accessed from the second processor and from the first processor is generated, as the parameter information, based on address information in which functions acquired from the first linker are mapped and information of address maps of registers and data memories of the first processor.

4. The programming method according to claim 3, wherein the arithmetic processing system has N (N is an integer not less than two) processors, and the parameter information generation steps are performed in N−1 tool flows out of total N tool flows of processors, respectively.

5. A non-transitory computer-readable medium storing therein a programming program allowing a computer including a processor and a memory, to function as a programming system implemented on the computer, the programming system comprising:

a first compiler that generates one or more object codes from a program code for a first processor included in an arithmetic processing system to which a plurality of processors are mutually connected;

a first linker that links the one or more object codes generated by the first compiler to generate an execution file for the first processor:

a parameter information generation unit that generates, based on the information acquired from the first linker, parameter information as a header file to be used in combination with a program code of a second processor included in the arithmetic processing system;

a second compiler that generates one or more object codes from the program code and the header file for the second processor; and a second linker that links the one or more object codes generated by the second compiler to generate an execution file for the second processor, wherein the parameter information is related to at least one of addresses of functions and of data which are commonly used by the first and second processors when the first and second processors execute respective execution files, and wherein connection between the plurality of processors in the arithmetic processing system conforms to memory mapped I/O system, and the parameter information generation unit generates, as the parameter information, a header file defining parameters that have possibility to be accessed from the second processor and from the first processor based on address information in which functions acquired from the first linker are mapped and information of address maps of registers and data memories of the first processor.

6. The non-transitory computer-readable medium according to claim 5, wherein the arithmetic processing system has N (N is an integer not less than two) processors, and the parameter information generation units generators are provided in N−1 tool flows out of total N tool flows of processors, respectively.

* * * * *